United States Patent Office 3,219,912
Patented Nov. 23, 1965

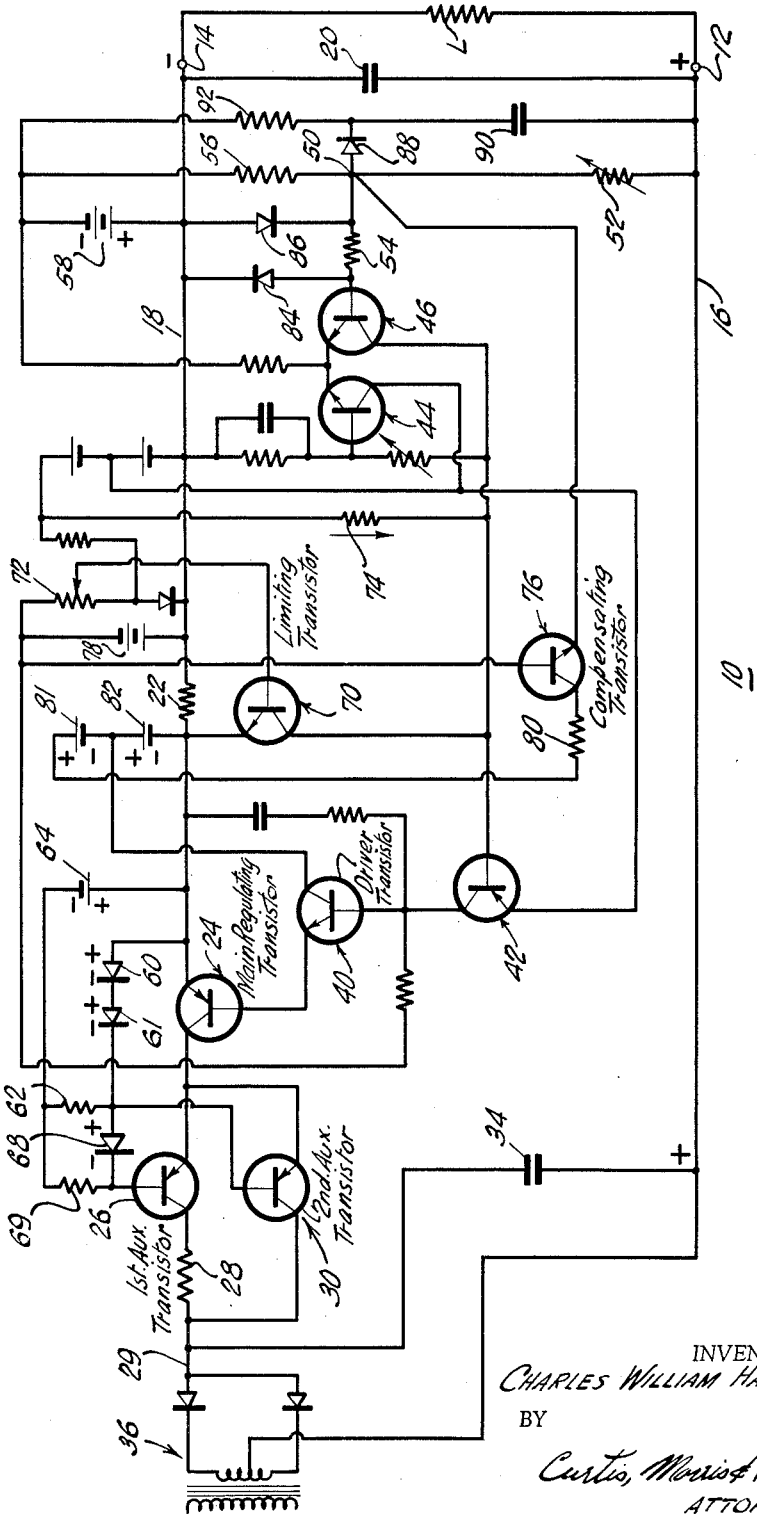

3,219,912
TRANSISTORIZED POWER SUPPLY
Charles William Harrison, Millington, N.J., assignor to Hewlett-Packard Company, Palo Alto, Calif., a corporation of California
Filed Nov. 30, 1961, Ser. No. 156,035
2 Claims. (Cl. 323—22)

This invention relates to a highly regulated direct current power supply.

An object of this invention is to provide a transistorized regulated voltage supply in which the output current can be limited with improved accuracy to any chosen value within a wide range.

Another object is to provide such a regulating circuit which is relatively simple and inexpensive but yet highly efficient and precise.

These and other objects will in part be understood from and in part pointed out in the following description.

Many present day electronic devices, such as delicate transistor circuits being developed in laboratories, and so forth, require precisely regulated voltages and currents. Unfortunately, these circuits are usually easily damaged by excessive voltage and current. Accordingly, there is a need for a power supply whose output voltage can be set to a desired value and held to this value within closely regulated limits. Now, one of the problems in using a supply of this kind is that the supply itself may be damaged by sudden short-circuits in the load. In the inventor's U.S. 2,942,174, there is disclosed a very effective power supply circuit which is protected against this danger.

Another aspect of this problem of drawing too much current from a power supply, even momentarily, is the possibility of burning out the load connected to the supply. This is particularly true in the case of transistor circuits where even the briefest overload may tremendously shorten the working life of the transistors in the circuit. It would be very helpful, therefore, to have a power supply in which the output current could be limited to a value in accordance with the maximum current safely handled by the load. The present invention provides a regulated power supply in which the output voltage can be set by a control knob to a chosen value and, further, the maximum current which can be drawn from the supply is limited with extreme precision to a value which is easily set by another control knob.

In accordance with the present invention, in one specific embodiment thereof, a transistorized voltage regulating circuit such as shown in co-pending application U.S. Serial No. 105,189, now Patent No. 3,158,801, is modified so that the output current can be limited with improved precision. This is accomplished by providing an additional transistor which is responsive to the current through the current sensing element of the circuit. When the current through this element reaches a given value, which can be chosen at will, the additional transistor turns on and prevents other elements of the circuit from causing substantial changes in the current supplied to them through the current sensing element. Thus, by holding this current constant, the current supplied to the load can be held almost exactly at the set value, even though the load may suddenly decrease to a short-circuit.

A better understanding of the invention together with a fuller appreciation of its many advantages will best be gained from the following description given in connection with the single figure of the drawing which shows the schematic circuit for a power supply embodying the invention.

The circuit 10 shown in the drawing is similar to that disclosed in U.S. Patent No. 3,158,801, and reference is made thereto for a detailed description of many of the elements of this circuit and their operation. Briefly, circuit 10 includes a pair of output terminals 12 and 14 across which a load L can be connected. Terminal 12, which is positive, is connected to a common or ground bus 16 and terminal 14 is connected to a negative output lead 18. Leads 16 and 18 are bypassed by a large filter capacitor 20.

Negative lead 18 is connected on its left end through a low ohmage current sensing resistor 22 (for example 3 ohms), a main regulating transistor 24, a first auxiliary transistor 26 and a voltage dropping resistor 28 to a negative input lead 29. Resistor 28 has a relatively high ohmage, for example, 100 ohms. Shunting first auxiliary transistor 26 and resistor 28 is a second similar auxiliary transistor 30. Lead 29, which is bypassed to bus 16 by a large filter capacitor 34, is supplied with unregulated direct voltage from a transformer-rectifier arrangement generally indicated at 36.

During operation of the unit, main regulating transistor 24 is directly controlled through a driver transistor 40, an intermediate control amplifier transistor 42 and a pair of transistors 44 and 46 connected as a differential amplifier. The latter senses the difference between the voltage on output lead 18 and the voltage at a point 50 determined by the setting of a variable resistor 52 to which the base of transistor 46 is connected. Resistor 52 is connected at junction 50 to a resistor 56 and a reference battery 58, these resistors forming a voltage divider. If the output voltage between leads 16 and 18 deviates from the value to which it has been set, then transistors 40–46 apply to the main regulating transistor a signal which increases or decreases the voltage drop across it to compensate for the change in output voltage.

Now, it will be noted that the base of auxiliary transistor 30 is connected to the emitter of transistor 24 through a pair of forward biased silicon diodes 60 and 61, each providing a voltage drop of 0.6 volt, for example. These diodes are kept conducting by a bias resistor 62 connected to the negative side of a battery 64. The base of auxiliary transistor 26 is similarly connected through a silicon diode 68 and diodes 60 and 61 to the emitter of transistor 24. Diode 68 is held conducting by a bias resistor 69 connected to battery 64.

When the emitter-to-collector voltage of transistor 24 drops below a first value slightly less than the voltage drop across diodes 60, 61, and 68, transistor 26 begins to conduct more and more. Under actual conditions transistor 26 and transistor 24 are never turned fully off because a small bleed current across the output even under no load conditions is assumed. When the voltage drop across main regulating transistor 24 decreases to a still lower second value (determined by the combined voltage drop across diodes 60 and 61) auxiliary transistor 30 will turn on.

Circuit 10 is equipped to prevent the drawing of more than a given amount of current from it by the following means. The voltage drop across current sensing resistor 22 when a given load current is reached turns on a current limiting transistor 70. This transistor is normally biased off, but when it turns on because of sufficient voltage drop across resistor 22, it seizes control of intermediate transistor 42 and prevents the main and auxiliary regulating transistors from passing more than a predetermined amount of current. The value at which the output current will be limited can be adjusted by changing the bias on the base of transistor 70 through a potentiometer 72. While transistor 70 has control of intermediate transistor 42, differential amplifier transistors 44 and 46 are ineffective.

Current is supplied to the collector of transistor 70 through a resistor 74. This resistor is also connected to the collector of transistor 46. Both this transistor and transistor 70 are of the same type (NPN) and the total current supplied to them by resistor 74 is essentially constant. This means that the current drawn through current sensing resistor 22 by certain elements of the circuit is more nearly constant. As a consequence the accuracy of current limiting in circuit 10 is improved.

To further improve the accuracy of current limiting of the circuit, when it is operating in its current limiting mode, junction 50 is supplied with current from a compensating transistor 76. The base of the latter is referenced through a suitable bias battery 78 to lead 18 and the collector of transistor 76 is connected to the left end of current sensing resistor 22 via a resistor 80 and bias batteries 81 and 82. Normally in the constant voltage mode, junction 50 remains within about a tenth of a volt of the voltage on lead 18. However, with the transfer of control from transistor 46 to limiting transistor 70 when circuit 10 goes into the current limited mode of operation, junction 50 tends to drop in voltage relative to lead 18. This gates or turns on compensating transistor 76 more and more and serves to maintain or clamp the voltage at junction 50 close to that on lead 18. The net result of this action is that the portion of current supplied to elements of circuit 10 through current sensing resistor 22 is maintained much more nearly constant. Consequently, for circuit 10 in its current limiting mode, incremental variations in current through sensing resistor 22 will be due substantially entirely to variations in the load current. Hence by holding these variations to a minimal amount (through the action of limiting transistor 70) the load current can be held almost exactly constant at a pre-determined, easily settable value.

It will be noted that the base of transistor 46 is connected through a diode 84 to lead 18. Similarly junction 50 is connected via a diode 86 to lead 18. Each of these diodes is a silicon type requiring a forward voltage drop of about ½ volt before effectively any current is conducted. They are poled opposite to each other as shown, and during normal operation of circuit 10 neither diode conducts. If, however, at no-load full output voltage setting, variable resistor 52 is suddenly turned down to lower the output voltage, filter capacitor 20 tends to discharge through resistor 52. In this event, diode 84 provides a current path to lead 18, thereby safeguarding transistor 46. Resistor 54 prevents burnout of variable resistor 52.

It will be noted that junction 50 is connected via a de-coupling diode 88 to one side of a capacitor 90, the other side of which is connected to positive lead 16. This capacitor is trickle changed through a resistor 92 and serves to make circuit 10 stable and to minimize hum. Now, if the output voltage of the circuit were set high, and the output were suddenly shorted, the charge on capacitor 90 will be harmlessly dissipated through diode 86, and diode 88. This prevents damage to transistor 46. When the short circuit is removed, diode 88 effectively disconnects capacitor 90 from the base of transistor 46 for a short interval and permits the circuit to supply normal output voltage almost immediately.

The above description of the invention is intended in illustration and not in limitation. Various changes in the embodiment illustrated may occur to those skilled in the art, and these can be made without departing from the spirit or scope of the invention as set forth.

I claim:
1. A power supply for delivering a regulated D.C. signal to a load, said supply comprising:
   a source of unregulated D.C. signal;
   a regulating element;
   a sensing resistor in series with the load;
   means including said regulating element and said sensing resistor and connecting said source to said load;
   means including a plurality of resistors serially-connected across said load to receive a signal related to the signal delivered to the load;
   first feedback means connected to a node of said serially-connected resistors and to said regulating element for controlling the conductivity thereof in response to signal at said node;
   second feedback means connected to said sensing resistor and to said regulating element for controlling the conductivity thereof when the voltage across said sensing resistor exceeds a predetermined value; and
   circuit means connected to said sensing resistor and to said node for supplying current thereto when the voltage across said sensing resistor exceeds said predetermined value.

2. A power supply for delivering a regulated D.C. signal to a load, said supply comprising:
   a source of unregulated D.C. signal;
   a regulating element;
   means for connecting said source to said load through said regulating element;
   current sensing means for sensing the current signal supplied to said load;
   voltage divider means connected across said load to provide a control signal related to the voltage signal delivered to the load;
   first feedback means connected to said voltage divider means and to said regulating element for controlling the conductivity thereof in response to said control signal;
   second feedback means connected to said current sensing means and to said regulating element for controlling the conductivity thereof when the current signal exceeds a predetermined value; and
   a gated clamp circuit means, connected between said current sensing means and said voltage divider means and responsive to the current signal exceeding said predetermined value, for maintaining the amplitude of said control signal at a predetermined constant value, thereby to more accurately control the current signal supplied to said load.

References Cited by the Examiner
UNITED STATES PATENTS

| | | | |
|---|---|---|---|
| 2,888,633 | 5/1959 | Carter | 323—22 |
| 2,904,742 | 9/1959 | Chase | 323—22 |
| 2,967,991 | 1/1961 | Deuitch | 323—22 |
| 2,974,270 | 3/1961 | Christiansen | 323—22 |
| 2,992,382 | 7/1961 | Heltzler et al. | 323—22 |
| 3,005,147 | 10/1961 | Thomas | 323—22 |
| 3,023,355 | 2/1962 | Thorsen | 323—9 |
| 3,040,238 | 6/1962 | Taddeo | 323—9 X |
| 3,078,410 | 2/1963 | Thomas | 323—22 |
| 3,109,980 | 11/1963 | Wiley | 323—22 |
| 3,158,801 | 11/1964 | Tighe et al. | 323—22 |

MILTON O. HIRSHFIELD, *Primary Examiner.*

LLOYD McCOLLUM, *Examiner.*